Dec. 27, 1966  S. SENDEROFF  3,294,585
THERMOCELL
Filed March 9, 1961
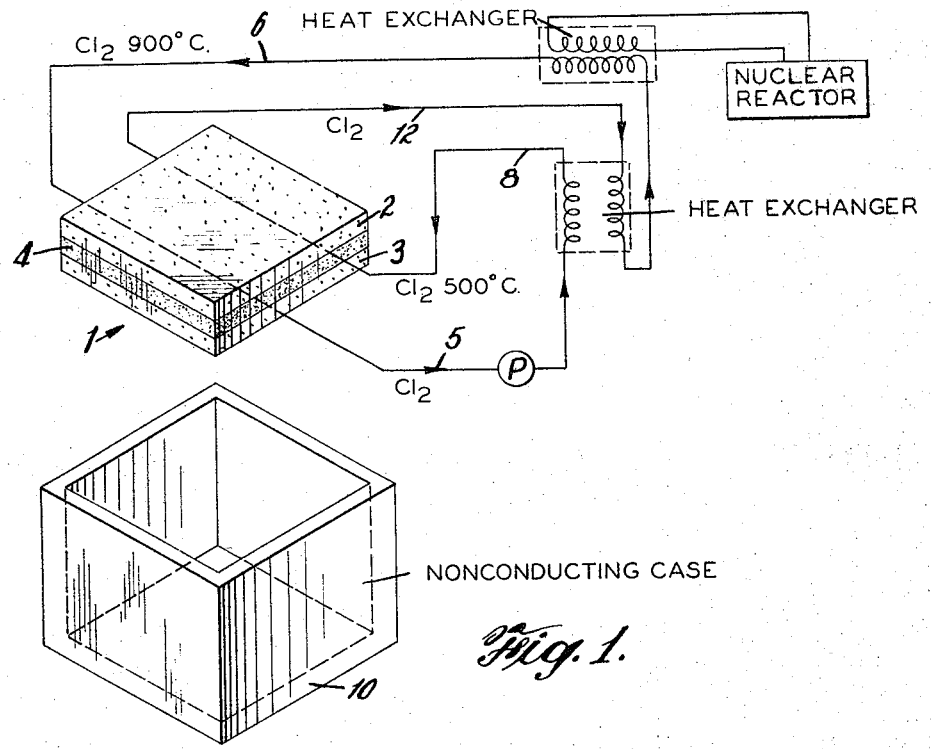
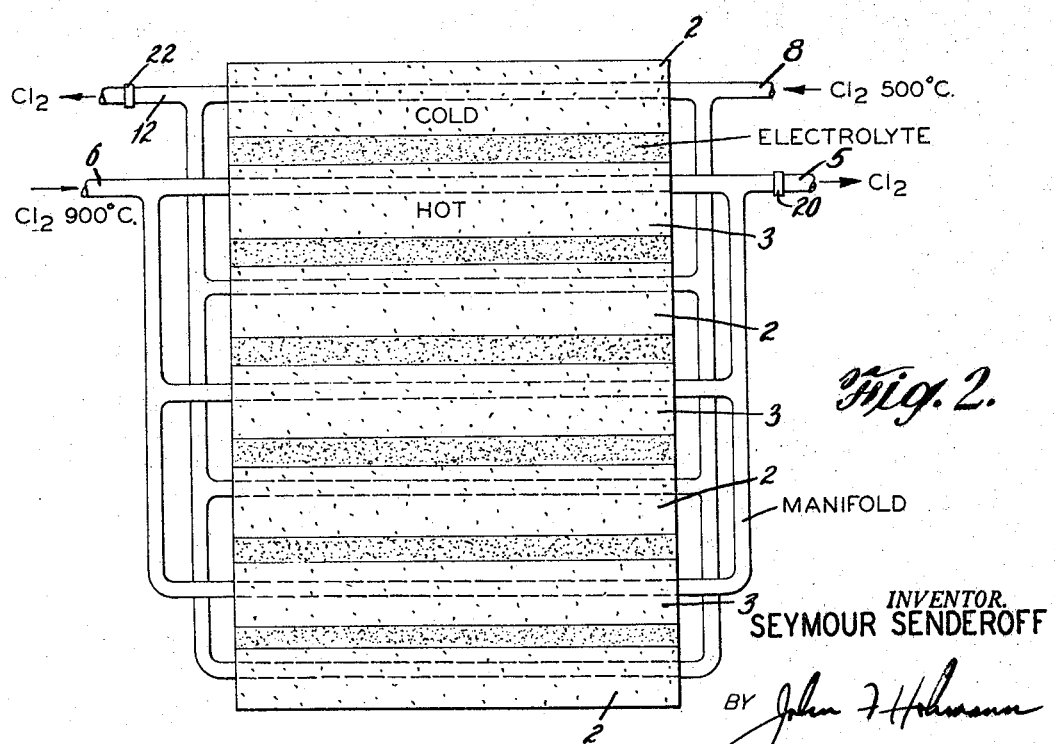
INVENTOR.
SEYMOUR SENDEROFF
BY
ATTORNEY United States Patent Office 3,294,585
Patented Dec. 27, 1966

3,294,585
THERMOCELL
Seymour Senderoff, Fairview Park, Ohio, assignor to Union Carbide Corporation, a corporation of New York
Filed Mar. 9, 1961, Ser. No. 94,619
5 Claims. (Cl. 136—86)

This invention relates to a thermocell with gas electrodes and molten salt electrolyte which may be used for direct conversion of heat to electricity and consists of two identical electrodes in contact with an electrolyte. A thermocell is equivalent to a thermocouple with one of the electronic conductors replaced by an ionically conducting electrolyte.

When a temperature difference is maintained between the electrodes, an electrical potential difference will be developed between them. If a closed external circuit is provided between them, current will flow through the cell. As a result of the electrochemical processes at each electrode, material is transferred from one electrode to the other when the current flows.

Several thermocell systems already have been suggested and tried in the prior art. One such system, which may be called type (a) consists of solid electrodes with a liquid or solid electrolyte.

Systems of type (a) are inconvenient because the electrode material removed from the hot side deposits in a poor physical form on the cold side and is not amenable to reuse by reversing the cell with respect to the temperature gradient. Furthermore, the reversal itself is inconvenient. Liquid electrodes in cells of type (a) are undesirable for many reasons, and particularly because of the low thermoelectric power ($10^{-1}$ to $10^{-2}$ millivolts per degree centigrade) they exhibit.

Another thermocell system, type (b), consists of two gas electrodes with a solid electrolyte.

Systems of type (b) can operate only at temperatures below the melting point of the electrolyte. Further, solids having sufficiently high electrical conductivity, all of it ionic, are not presently available at temperatures above 500° C.

Viewed against the background of the above-outlined prior art, an object of the present invention is to provide an improved gaseous thermocell, free from the limitations of prior art devices of this class.

A further object of this invention is to provide an improved thermocell capable of operating at high current densities with little polarization.

Another object of this invention is to provide an improved thermocell capable of operating with a very large temperature gradient which is not easily accomplished with aqueous systems.

Another object of this invention is to provide a thermocell capable of operating efficiently at very hig temperatures near 1000° C. and higher.

An additional object of the present invention is to provide a gaseous thermocell capable of using a wide variety of heat sources for its operation.

These and other related objects, features and advantages of the present invention will be more readily understood as the description thereof proceeds; particularly when taken together with the accompanying drawing, wherein:

FIGURE 1 is a schematic representation of a system using the present cells.

FIGURE 2 is a detailed, front elevational view of cells stacked in accord with the invention.

Broadly defined, the gaseous thermocell of the present invention comprises electrodes consisting of a gas in contact with a molten salt electrolyte containing simple or complex ions of gas, and inert current collectors on which the electrochemical reaction involving the gas, electrolyte, and liberated or absorbed electrons occurs. The cell may have chlorine in contact with pure or mixed molten chloride electrolytes; or oxygen in contact with pure or mixed molten oxide electrolytes; or salts with oxygenated anions or cations; or, of hydrogen gas in contact with molten hydroxides, hydrides or acid salts, together with porous current collectors composed of carbon, graphite, transition metals and oxides thereof, or tantalum, silver or platinum. With respect to these collectors, it should be noted that selection of a particular material for the collector depends on the particular gas used in the system and on the composition of the electrolyte. Generally, however, graphite may be used with chlorine and hydrogen. The other listed materials are more suitable for use in conjunction with oxygen gas. Whatever the material, the collectors on the hot and cold side of the cell are identical.

The electrolyte employed in any given thermocell constructed in accord with the teachings of this invention should have the following properties:

(1) Low melting point
(2) High boiling point
(3) Low vapor pressure
(4) High electrical, conductivity of an exclusively ionic nature
(5) Low thermal conductivity
(6) It must be capable of rapid reaction with the gas electrode.

Referring now to the drawing, FIGURE 1 shows schematically a system which employs the present cell. The cell is represented in its simplest form and denoted generally by reference character 1. In said form, the cell consists simply of two inert, porous, current collectors 2 and 3, having suitable channels for transporting gas in their outer faces for bringing gas to the collector-electrolyte interface and having a layer of molten salt electrolyte 4 sandwiched between their inner faces. Conduit means 6 shown in FIGURE 2 and by the arrow in FIGURE 1 bring hot chlorine gas (at for example 900° C.) to the manifold associated with hot current collector 3 from a heat exchanger through one part of which circulates reactor coolant from a nuclear reactor. Another conduit denoted by arrow 5 takes the chlorine, which has lost some of its heat as a result of heating collector 3, to a second heat exchanger. Here, the chlorine gas loses more heat to reach a temperature of say 500° C. and is conveyed to cold collector 2 through conduit 8. Another conduit 12 takes the chlorine from collector 2 and on to the second and finally to the first heat exchanger for recirculation through the cell. A pump, inserted preferably at a position near arrow 5 (downstream from the hot collector), circulates the gas through the collectors and heat exchangers. This pump also assists in drawing into the stream the gas produced at the inner-face of collector 2 and in forcing through collector 3 the gas consumed at its inner-face.

It will be appreciated, however, that any suitable heat source may be used instead of the one shown.

With a battery constructed as above-described and using chlorine gas at 900° C. and 500° C., silver chloride as the electrolyte and porous graphite as collectors, a thermoelectric power of 0.65 millivolt per degree centigrade was obtained. 0.55 millivolt per degree centigrade was the thermoelectric power obtained when silver chloride was replaced by the eutecic mixture of potassium chloride-lithium chloride containing 54.5 weight percent of potassium chloride. The observed current densities were as high as 700 milliamperes per centimeter square with very little polarization. It should be noted from these two examples that the thermoelectric power of the subject cell when a chlorine electrode is used in conjunction with a chloride melt, varies only slightly with a change in cation when the cation is a simple chloride ion. With complex chloride ions in the electrolyte, i.e. ($AlCl_4$) in $NaAlCl_4$ electrolytes larger thermoelectric powers are obtained of the order of about 1.0 to 1.4 mv. per degree centigrade.

The sandwich of FIGURE 1 may be repeated, interposing between each unit a layer of molten salt electrolyte, the assembly being stacked either vertically as shown on FIGURE 2 or horizontally. The gas channels of the alternate collectors (i.e. the hot collectors 3) are connected to an intake and exhaust manifold, as are the gas channels in the other set of alternate collectors (i.e. the cold collectors 2). The desired temperature in the alternate sets are maintained by means of the heat exchangers and the flow rate by means of the pump of the circulating gas. Electrical leads 20, 22 connected to the end collectors, one hot and one cold, take off the current generated by the battery. Where the gas manifolds are good electrical conductors as in the case of graphite, this results in a parallel cell arrangement. A number of such batteries may be externally connected in series or parallel. Desired combinations of series and parallel cell arrangements may thus be made. The entire battery is enclosed in a non-conductive container 10, the material determined by the nature of the electrolyte and operating temperatures; i.e. fused silica or alumina for molten chlorides, fused magnesia for molten carbonates.

Alternatively, the assembly of FIGURE 1 may be enclosed in a suitable ceramic frame, with the collectors cemented into the frame. Such units may be stacked horizontally, each separated from its neighbor and series connected by joining the cold collector of one cell to the hot collector of the next with a good electrical conductor, preferably composed of the material of the collector itself.

What is claimed is:

1. A device for converting heat energy into electrical energy comprising a first inert, porous, current collector adapted to receive a gas at a predetermined temperature, a second, inert, porous current collector adapted to receive the same gas at a temperature higher than said predetermined temperature, the resulting temperature differential between said collectors being sufficient to generate an electromotive force therebetween, and an electrolyte intermediate said collectors, said electrolyte remaining molten at the operating temperature of said cell and containing ions of said gas.

2. The device of claim 1, wherein said collectors are composed of a material selected from the group consisting of carbon, graphite, tantalum, platinum, transition metals and oxides thereof.

3. A device for converting heat energy into electrical energy comprising a first, porous carbon current collector adapted to receive chlorine gas, at a predetermined temperature; a second, porous carbon current collector adapted to receive chlorine gas at a temperature higher than said predetermined temperature, and a chloride-containing electrolyte intermediate said collectors and molten at the operating temperature of said device.

4. The device of claim 3, wherein the chloride-containing electrolyte consists of a complex chloride.

5. The device of claim 4, wherein said electrolyte consists of sodium-aluminum tetrachloride.

References Cited by the Examiner

UNITED STATES PATENTS

| | | | |
|---|---|---|---|
| 736,016 | 8/1903 | Reid | 136—86.1 |
| 2,890,259 | 6/1959 | Weininger | 136—4 |
| 3,031,518 | 4/1962 | Werner et al. | 136—86 |

WINSTON A. DOUGLAS, *Primary Examiner.*

JOHN R. SPECK, JOHN H. MACK, *Examiners.*

H. FEELEY, *Assistant Examiner.*